United States Patent
Arana et al.

(10) Patent No.: US 9,215,267 B2
(45) Date of Patent: Dec. 15, 2015

(54) ADAPTIVE STREAMING FOR CONTENT PLAYBACK

(71) Applicant: Disney Enterprises, Inc., Burbank, CA (US)

(72) Inventors: Mark Arana, West Hills, CA (US); Kevin Liao, Rancho Palos Verdes, CA (US); Jared McPhillen, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 337 days.

(21) Appl. No.: 13/830,374

(22) Filed: Mar. 14, 2013

(65) Prior Publication Data

US 2014/0280749 A1   Sep. 18, 2014

(51) Int. Cl.
*G06F 15/16* (2006.01)
*H04L 29/08* (2006.01)
*H04L 29/06* (2006.01)
*G06F 12/00* (2006.01)

(52) U.S. Cl.
CPC .......... *H04L 67/06* (2013.01); *H04L 29/06027* (2013.01); *H04L 65/1083* (2013.01); *H04L 65/604* (2013.01)

(58) Field of Classification Search
CPC  H04L 65/60; H04L 65/607; H04N 21/23439; H04N 21/8456; H04N 21/6125

USPC .................................. 709/219, 231, 233, 234
See application file for complete search history.

(56) References Cited

U.S. PATENT DOCUMENTS

| | | | |
|---|---|---|---|
| 8,335,873 B2 * | 12/2012 | Tinsman | 710/52 |
| 2010/0017533 A1 * | 1/2010 | Han | H04N 5/783 709/231 |
| 2011/0113122 A1 * | 5/2011 | Drope | 709/219 |
| 2012/0179833 A1 * | 7/2012 | Kenrick et al. | 709/231 |
| 2013/0067109 A1 * | 3/2013 | Dong et al. | 709/231 |
| 2013/0117415 A1 * | 5/2013 | Gilson | 709/219 |
| 2013/0232228 A1 * | 9/2013 | Ramamurthy et al. | 709/219 |
| 2014/0052846 A1 * | 2/2014 | Scherkus et al. | 709/224 |
| 2014/0068096 A1 * | 3/2014 | Shivadas et al. | 709/231 |
| 2014/0149557 A1 * | 5/2014 | Lohmar et al. | 709/219 |
| 2014/0156863 A1 * | 6/2014 | Gao et al. | 709/231 |
| 2014/0215085 A1 * | 7/2014 | Li et al. | 709/231 |

* cited by examiner

*Primary Examiner* — Zarni Maung
(74) *Attorney, Agent, or Firm* — Patent Ingenuity, P.C.; Samuel K. Simpson

(57) ABSTRACT

Streamed content that is a subset of a set of content is received. Further, the streamed content is stored. In addition, at least a portion of the streamed content is played. A request to download a remainder of the set of content is received. Further, a download bitrate is selected. In addition, the remainder of the set of content is received according to the download bitrate.

20 Claims, 5 Drawing Sheets

ADAPTIVE STREAMING FOR CONTENT PLAYBACK

BACKGROUND

1. Field

This disclosure generally relates to the field of data content. More particularly, the disclosure relates to the delivery of data content.

2. General Background

Content such as audio and/or video content may generally be sent to computing devices via streaming. The streaming approach allows content to be received by a computing device and played back by that computing device during delivery. In other words, a user utilizing a computing device may begin playback of the content before the entirety of the content has been received. For example, a user may begin watching the beginning of a video that has been received while the middle and the end of the video are still being delivered. By the time that the video reaches the middle or the end of the video, the corresponding portion has either been delivered or the video player waits for the corresponding portion. Waiting times can often lead to interruptions in playback of streamed content.

Further, a user may decide that he or she wants to download an entire video after watching a portion of the video. Current configurations only temporarily cache the streamed data. The streamed data is then deleted after being utilized for streaming. As a result, the user has to download the video in its entirety if the user wants to obtain the entire video. Accordingly, users of current configurations have to spend time streaming content and then downloading all of that same content again. Therefore, the current streaming configurations are inefficient.

SUMMARY

Streamed content that is a subset of a set of content is received. Further, the streamed content is stored. In addition, at least a portion of the streamed content is played. A request to download a remainder of the set of content is received. Further, a download bitrate is selected. In addition, the remainder of the set of content is received according to the download bitrate.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

An adaptive streaming device is provided for content playback. The content may be video, audio, video and audio, or the like. The adaptive streaming device allows a user to store cached data that is streamed while viewing the streamed content corresponding to the cached data. If the user decides to download the content during the content viewing, a single bitrate may be selected to further complete the download. In one aspect, the bitrate may be automatically determined based upon a predetermined criterion. In another aspect, the bitrate may be manually inputted by a user. In yet another aspect, a variety of bitrates may be selected to further complete the download.

The adaptive streaming device allows a user to more quickly download content utilizing portions of a previously viewed adaptive stream. The remainder of the content is downloaded at a particular bitrate.

Figure 1:
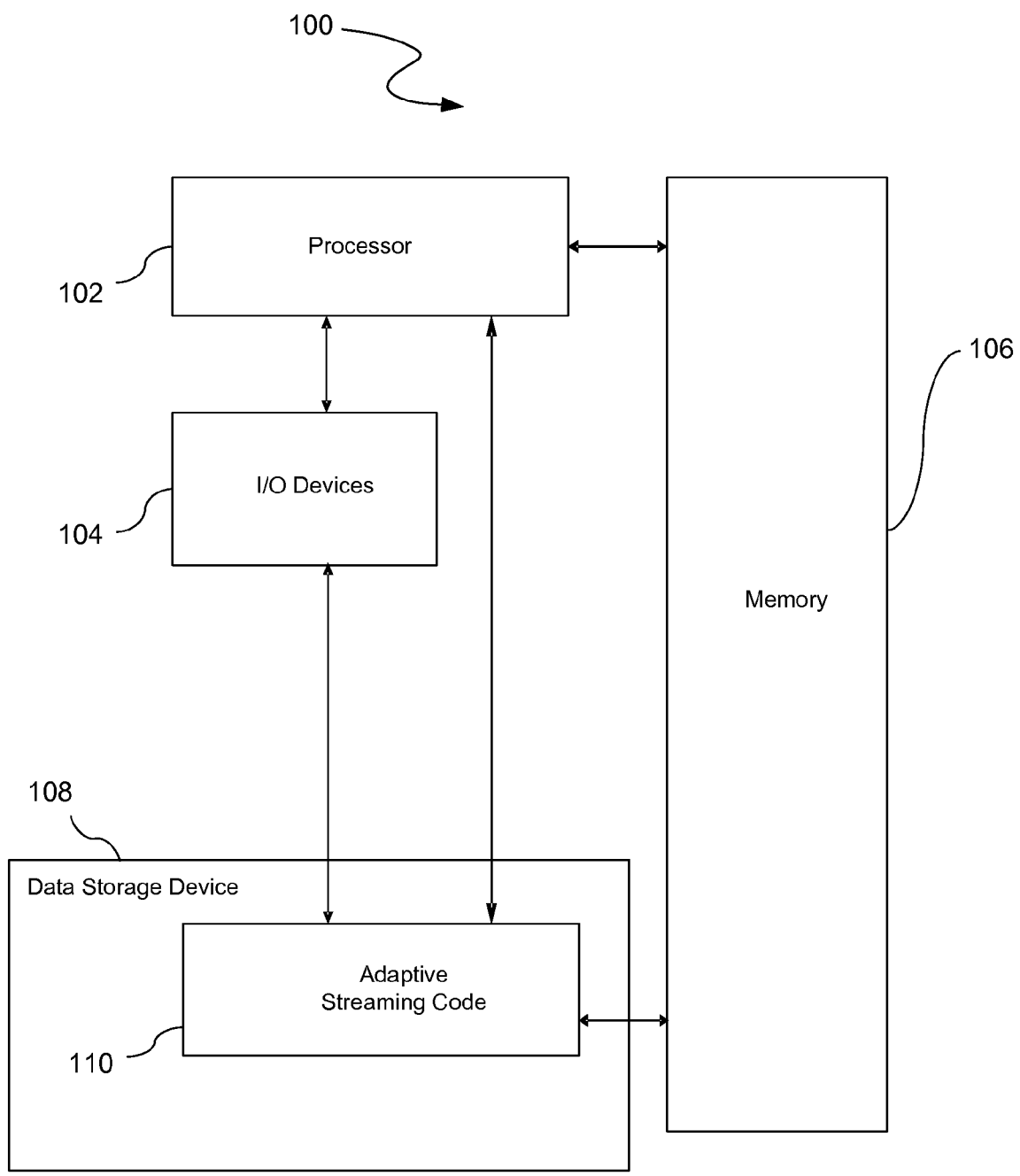
FIG. 1 illustrates an adaptive streaming device that is utilized to provide adaptive streaming.

FIG. 1 illustrates an adaptive streaming device 100 that is utilized to provide adaptive streaming. In one aspect, the adaptive streaming device 100 is implemented utilizing a general purpose computing device or any other hardware equivalents. As illustrated, the system 100 comprises a processor 102, a memory 106, e.g., random access memory ("RAM") and/or read only memory (ROM), a data storage device 108 that stores adaptive streaming code 110, and various input/output ("I/O") devices 104, e.g., audio/video outputs and audio/video inputs, a receiver, a transmitter, a speaker, a display, an image capturing sensor, e.g., those used in a digital still camera or digital video camera, a motion capture configuration, a clock, an output port, a user input device such as a remote control, a keyboard, a keypad, a mouse, and the like, or a microphone for capturing speech commands. In an alternative aspect, certain I/O devices 104 are in operable communication with the adaptive streaming device 100 rather than being integrated within the adaptive streaming device 100. As an example, the adaptive streaming device 100 may be a set top box that is in operable communication with a television.

In one aspect, the data storage device 108 loads the adaptive streaming code 110 from a computer readable storage medium, e.g., a magnetic or optical drive, diskette, or non-volatile memory, DVD, CD-ROM, or the like. The adaptive streaming code 110 is then operated by the processor 102 in the memory 106 of the adaptive streaming device 100. In another aspect, the data storage device 108 is the computer readable storage medium. In yet another aspect, the adaptive streaming code 110 is stored in the memory 106 rather than the data storage device 108. As such, the adaptive streaming code 110 and associated data structures of the present disclosure may be stored on a computer readable medium, e.g., RAM memory, magnetic or optical drive or diskette or the like.

The adaptive streaming device 100 may be utilized in various types of configurations, e.g., computing devices, set top boxes, portable devices, etc. Examples of computing devices include, but are not limited to, desktop computers, laptop computers, smartphones, tablet devices, gaming consoles, kiosks, or the like.

Figure 2:
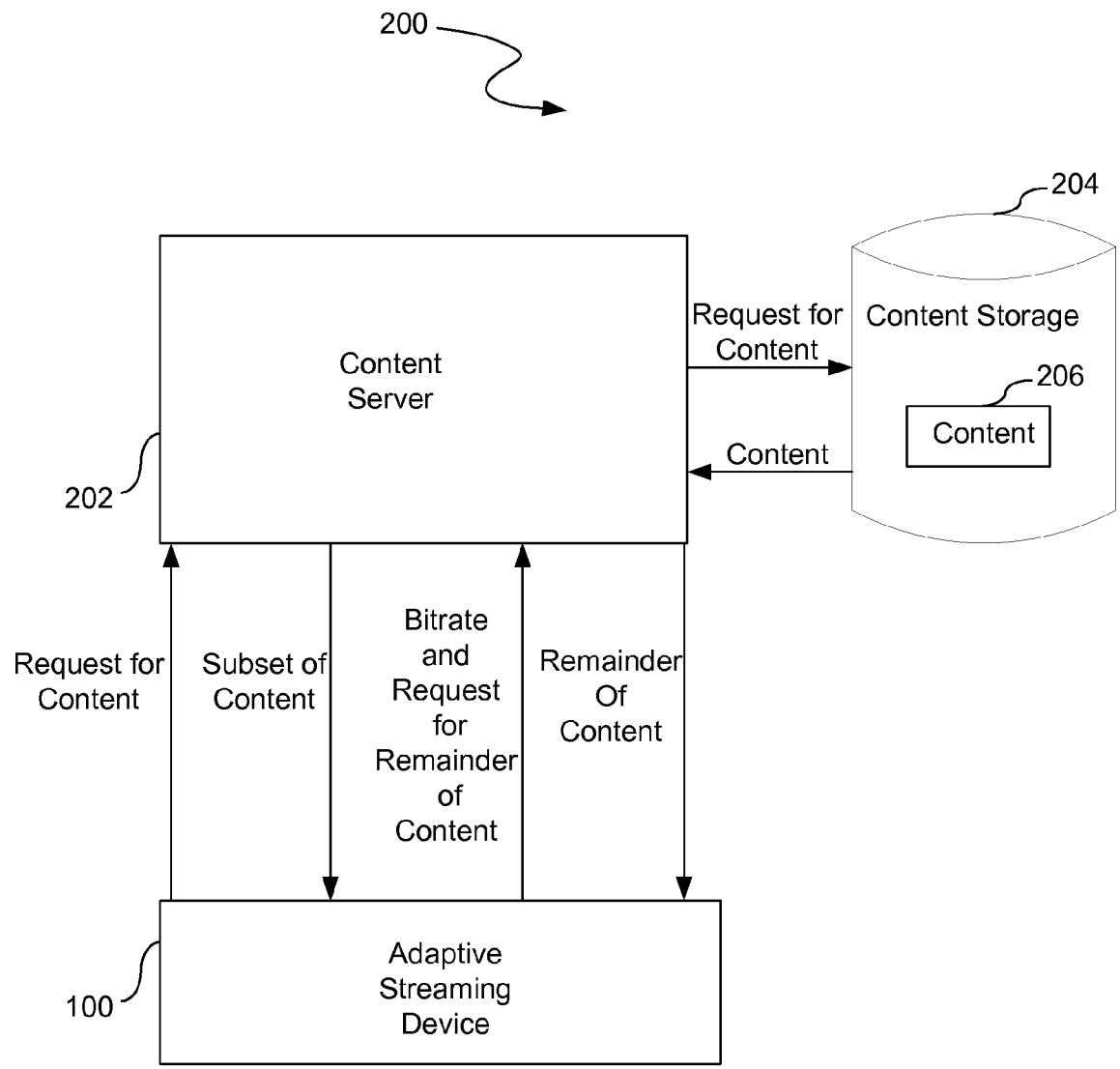
FIG. 2 illustrates an example of an adaptive streaming system in which the adaptive streaming device is utilized.

FIG. 2 illustrates an example of an adaptive streaming system 200 in which the adaptive streaming device 100 is utilized. The adaptive streaming system 200 includes the adaptive streaming device 100, a server 202, and a content storage 204. The adaptive streaming device 100 requests content from the server 202. The server 202 may be a computing device such as a server computer. In one aspect, the server 202 is in operable communication, e.g., cable connection, wireline network connection, wireless network connection, or the like, with the content storage 204. In another aspect, the content storage 204 is integrated into the content server 202, e.g., a disk drive, memory device, or the like.

The content storage 204 stores content 206, e.g., movies, television shows, videos, audio files, or the like. The content 206 may be stored in a single file or multiple files. Further, the content 206 may be a single set of data such as a single television show or multiple sets of data such as multiple televisions shows.

The server 202 requests the content 206 from the content storage 204 that was requested by the adaptive streaming device 100. After receiving the content 206 from the content storage 204, the server 204 provides a subset of the content 206 to the adaptive streaming device 100, e.g., via streaming, so that the adaptive streaming device 100 may initiate playback before receiving all of the content 206.

During playback of the streamed content, the user utilizing the adaptive streaming device 100 may decide that he or she wants to receive the remainder of the content 206 without having played through the entirety of the streamed content. For example, the user may play a small portion of the content 206 and decide that he or she wants to download the entirety of the content 206. In contrast with previous configurations, the portion of the content 206 that has been streamed and cached is not deleted. The portion of the content 206 that has been streamed is utilized by the adaptive streaming device 100 as part of the entire content 206. As a result, a user obtains the content 206, e.g., through streaming a portion and downloading a remaining portion, faster with the adaptive streaming system 200 than the downloading of entire content performed by previous configurations.

In one aspect, the user also has the ability to determine the bitrate for the remainder of the subset of the content 206. For example, the user may select bitrates according to the picture quality of the content, e.g., high, medium, or low. The slowest bitrate corresponds to high picture quality, the medium bitrate corresponds to medium picture quality, and the fastest bitrate corresponds to the lowest picture quality. For instance, a user that may want to watch a full movie at a later time may select a bitrate corresponding to a high picture quality whereas a user that wants to watch the full movie as quickly as possible may select a bitrate corresponding to a low picture quality.

In an alternative aspect, the determination of the bitrate is determined automatically by the adaptive streaming device 100. The adaptive streaming device 100 may utilize various criteria to determine the bitrate. For example, criteria such as processor speed, available bandwidth, local system's output capability, local system restrictions, or the like may be utilized. An example of a local system's output capability is a television only being able to display HD content if there data is received through an HDMI port. Further, an example of a local system restriction is a license limitation that prohibits viewing of content at a particular time, location, or device irrespective of the capabilities of the local system. Accordingly, the adaptive streaming device 100 intelligently determines the bit rate that may be received by the capabilities of such a television and utilizes that capability as a criterion for the selection of the bitrate.

In yet another aspect, the determination of the bitrate is determined both by manual and automatic inputs. For example, the user can provide an indication of the amount of time in which the user wants to receive the entirety of the content 206. The adaptive streaming device 100 may then determine the bitrate based upon both the user input and various other criteria such as processor speed, available bandwidth, local system's output capability, or the like.

In another aspect, the determination of the bitrate is determined by the rights corresponding to the content that have been purchased. For example, a user may purchase content viewing rights in SD and HD for an adaptive streaming device 100 such as a television device. That same user may have only purchased SD for portable devices. Accordingly, the determination of the bitrate may be determined based upon the particular viewing device and/or corresponding viewing rights for that particular viewing device. The bitrate determination may be determined by a variety of types rights other than viewing rights, e.g., type of adaptive streaming device 100, type of operating system run on the adaptive streaming device 100, type of application run on the adaptive streaming device 100, or the like.

In one configuration, the user has the ability to adjust the bitrate after selection. For example, the user may have selected a particular bitrate for a fast download. The user may then determine that he or she has more time available and that a bitrate for a slower download is enough. The adaptive streaming device 100 allows the user to change the bitrate so that the content that has not been downloaded may be downloaded at the most recent bitrate indicated by the user.

In another configuration, the user has the ability to obtain previous data at the most recent bitrate. For example, the user may have obtained a fast download of some of the content at a low picture quality and may then determine that he or she wants a different bitrate. The adaptive streaming device 100 allows the user to download content that has not been downloaded yet at the most recent bitrate and re-download content that has already been downloaded at the most recent bitrate. In the example, the user received a portion of content at a low picture quality and then determined that he or she had time to receive content at a high picture quality. Accordingly, the user may download the content that has not been received at the high picture quality and re-download the content that has been received at the high picture quality.

In one aspect, the adaptive streaming device 100 allows the user to override the selection of a bitrate by the adaptive streaming device 100. For example, the adaptive streaming device 100 may determine that a high picture quality is ideal given various system parameters. The user may not have enough time for such a download of the content at a high picture quality. Accordingly, the user can override the selection of the bitrate by the adaptive streaming device 100.

Figure 3A:
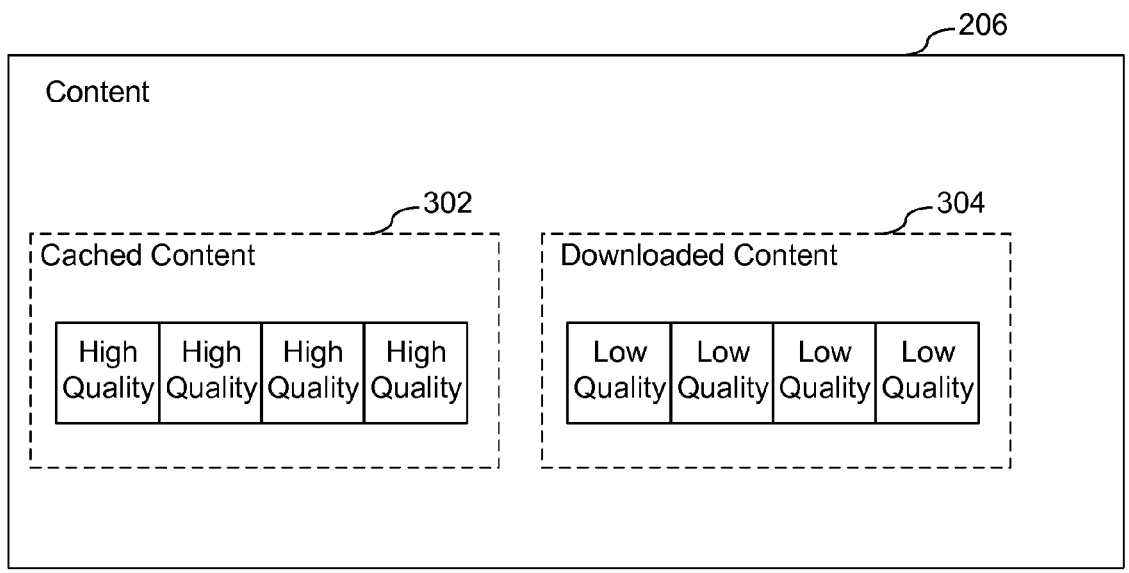
FIG. 3A illustrates an example of the content in which a cached portion is streamed at a high picture quality bitrate, and the remaining subset of the content is downloaded at a low picture quality bitrate.
Figure 3B:
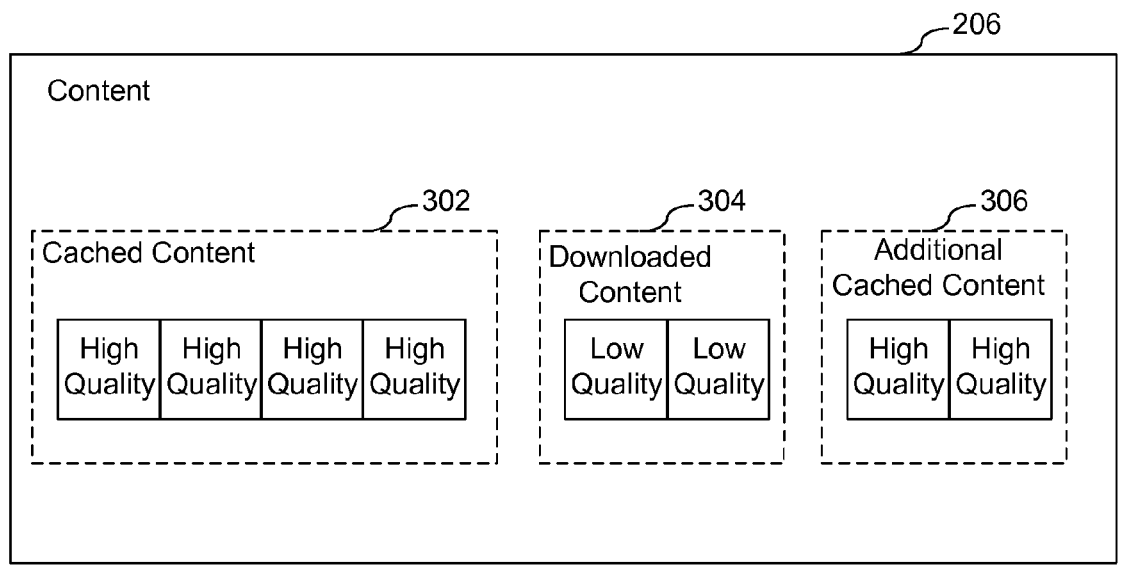
FIG. 3B illustrates an example of the content in which a cached portion is streamed at a high picture quality bitrate, and the user jumps to the end of the content to view the end of the content.

FIGS. 3A and 3B illustrate examples of the content 206 illustrated in FIG. 2 being streamed and downloaded by the adaptive streaming device 100 illustrated in FIGS. 1 and 2. FIG. 3A illustrates an example of the content 206 in which a cached portion 302 is streamed at a high picture quality bitrate and the remaining subset 304 of the content 206 is downloaded at a low picture quality bitrate. The bits of data are indicated as either high quality or low quality for illustrative purposes. Accordingly, this example allows a user to download the remainder 304 of the content 206 at the fastest bitrate available.

The adaptive streaming device 100 may also be utilized to download content for a gap that results from a trick play, e.g., a command such as jump, fast forward, or rewind. FIG. 3B illustrates an example of the content 206 in which a cached portion 302 is streamed at a high picture quality bitrate and the user jumps to the end of the content to view the end of the content. The end of the content is cached as an additional cached portion 306. After watching the additional cached portion 306, the user decides to download the entirety of the content 206. A gap has resulted between the cached portion 302 and the additional cached portion 306 that have been streamed and stored. Accordingly, the adaptive streaming device 100 downloads the data 304 in the gap at a selected bitrate.

In another aspect, the downloaded content may be broadcasted or multicasted. As an example, the downloaded content may be multicasted to devices in a home network.

Figure 4:
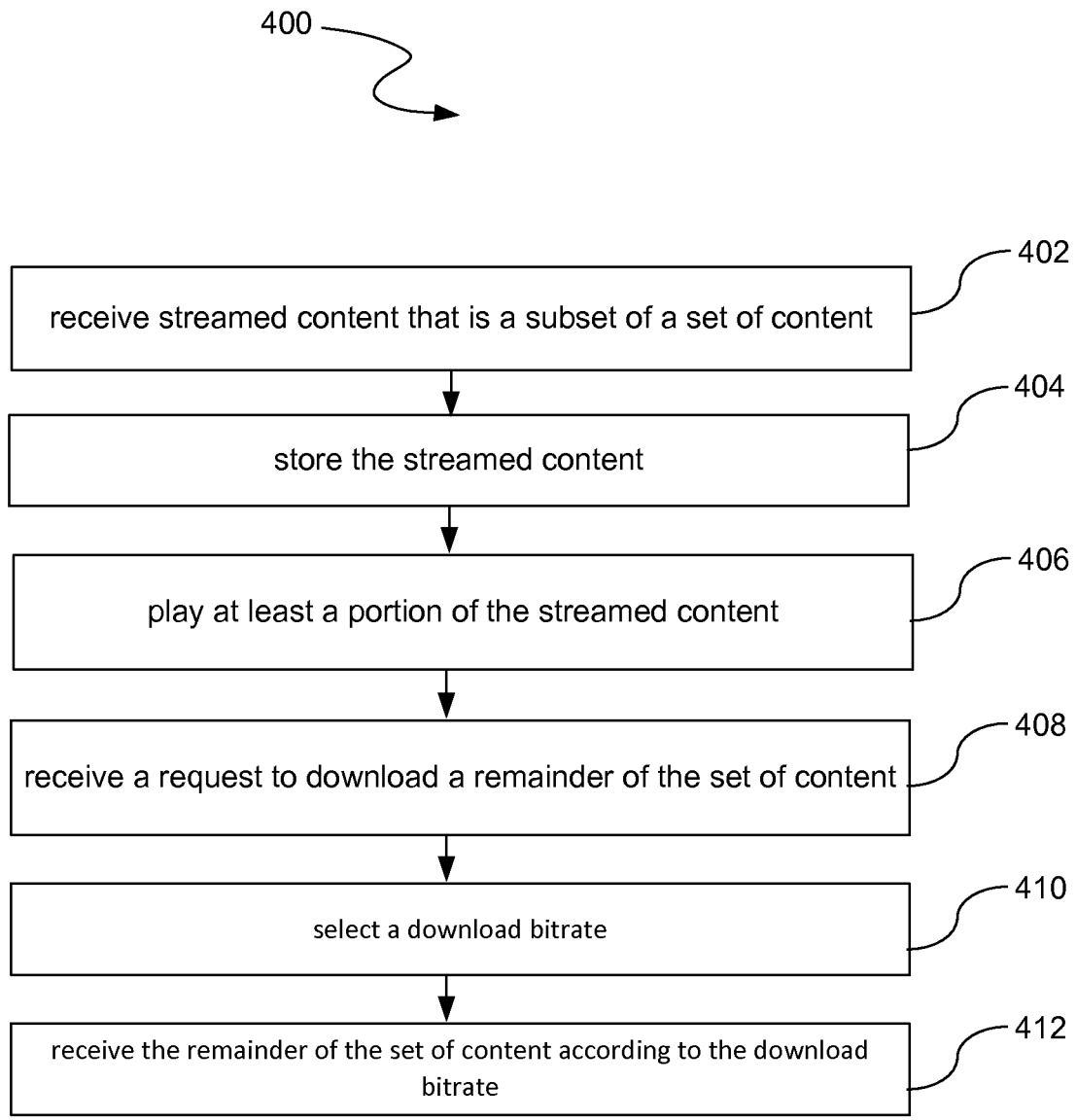
FIG. 4 illustrates a process that is utilized for adaptive streaming.

FIG. 4 illustrates a process 400 that is utilized for adaptive streaming. At a process block 402, the process 400 receives streamed content that is a subset of a set of content. Further, at a process block 404, the process 400 stores the streamed content. In addition, at a process block 406, the process 400 plays at least a portion of the streamed content. At a process block 408, the process 400 receives a request to download a remainder of the set of content. Further, at a process block 410, the process 400 selects a download bitrate. In addition, at a process block 412, the process 400 receives the remainder of the set of content according to the download bitrate.

The processes described herein may be implemented in a general, multi-purpose or single purpose processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A computer program product comprising a computer readable storage device having a computer readable program stored thereon, wherein the computer readable program when executed on a computer causes the computer to:
receive, at a computing device, a first request for streamed content that is a subset of a set of content;
receive, at the computing device, the streamed content from a network;
store, at the computing device, the streamed content;
play, at the computing device, at least a portion of the streamed content;
receive, at the computing device, a second request to download a remainder of the set of content;
select, at the computing device, a download bitrate; and
receive, at the computing device, the remainder of the set of content from the network according to the download bitrate without deleting the streamed content such that an entirety of the set of content is received in a period of time that is less than an entire download of the set of content.

2. The computer program product of claim 1, wherein the download bit rate is selected according to a predetermined criterion.

3. The computer program product of claim 2, wherein the predetermined criterion is selected from the group consisting of: processor speed, bandwidth availability, and local system output capability.

4. The computer program product of claim 1, wherein the computer is further caused to receive a trick play capability that generates a gap in the streamed content.

5. The computer program product of claim 4, wherein the computer is further caused to download content for the gap in the streamed content at an additional download bitrate.

6. The computer program product of claim 1, wherein the storing of the streamed content is performed without prior deletion of the streamed content.

7. The computer program product of claim 1, wherein the selection of the download bitrate is automatic.

8. The computer program product of claim 1, wherein the selection of the download bitrate is manual.

9. A method comprising:
receiving, at a computing device, a first request for streamed content that is a subset of a set of content;
receiving, at the computing device, the streamed content from a network;
storing, at the computing device, the streamed content;
playing, at the computing device, at least a portion of the streamed content;
receiving, at the computing device, a request to download a remainder of the set of content;
selecting, at the computing device, a download bitrate; and
receiving, at the computing device, the remainder of the set of content from the network according to the download bitrate without deleting the streamed content such that an entirety of the set of content is received in a period of time that is less than an entire download of the entire set of content.

10. The method of claim 9, wherein the download bit rate is selected according to a predetermined criterion.

11. The method of claim 10, wherein the predetermined criterion is selected from the group consisting of: processor speed, bandwidth availability, and local system output capability.

12. The method of claim 11, further comprising receiving a trick play capability that generates a gap in the streamed content.

13. The method of claim 12, further comprising downloading content for the gap in the streamed content at an additional download bitrate.

14. The method of claim 9, wherein the storing of the streamed content is performed without prior deletion of the streamed content.

15. The method of claim 9, wherein the selection of the download bitrate is automatic.

16. The method of claim 9, wherein the selection of the download bitrate is manual.

17. An apparatus comprising:
a processor that receives a first request for streamed content that is a subset of a set of content, receives the streamed content from a network, stores the streamed content, plays, at least a portion of the streamed content, receives a request to download a remainder of the set of content, selects a download bitrate, and receives the remainder of the set of content from the network according to the download bitrate without deleting the streamed content such that an entirety of the set of content is received in a period of time that is less than an entire download of the entire set of content.

18. The apparatus of claim 17, wherein the download bit rate is selected according to a predetermined criterion.

19. The apparatus of claim 18, wherein the predetermined criterion is selected from the group consisting of: processor speed, bandwidth availability, and local system output capability.

20. The apparatus of claim 19, further comprising receiving a trick play capability that generates a gap in the streamed content.

* * * * *